United States Patent [19]
Kimura et al.

[11] 3,947,861
[45] Mar. 30, 1976

[54] FILM FRAME COUNTING DEVICES FOR STILL CAMERAS

[75] Inventors: Shuji Kimura; Kouichi Daitoku, both of Tokyo, Japan

[73] Assignee: Nippon Kogaku, Tokyo, Japan

[22] Filed: July 22, 1974

[21] Appl. No.: 490,335

[30] Foreign Application Priority Data
July 23, 1973 Japan.................................. 48-82999

[52] U.S. Cl................................ 354/217; 352/172
[51] Int. Cl.²............................................ G03B 17/36
[58] Field of Search...................... 354/217; 352/172

[56] References Cited
UNITED STATES PATENTS

| | | | |
|---|---|---|---|
| 2,985,083 | 5/1961 | Miyasaka............................ | 354/217 |
| 3,816,842 | 6/1974 | Glaros................................. | 352/172 |

Primary Examiner—Richard M. Sheer
Attorney, Agent, or Firm—Shapiro and Shapiro

[57] ABSTRACT

A counting device in a still camera for indicating the exact number of frames of long-footage film exposed during regular photography includes a numerical counter and a drive gear rotatable in response to film movement for increasing the count in the counter by one for each frame of film advance, the drive gear being effective to change the count only after advance of the leader portion of the film. A cam which is incrementally rotated by an escapement mechanism in response to each frame of film advance moves a release lever to a first position for preventing counting during advancement of the leader portion of the film and thereafter to a second position for permitting counting.

12 Claims, 7 Drawing Figures

FILM FRAME COUNTING DEVICES FOR STILL CAMERAS

BACKGROUND OF THE INVENTION

1. Field of the Invention

This invention relates to an improved film frame counting device in a still camera using long-footage film, and is more particularly directed to a device which indicates the exact number of film frames exposed during regular, as opposed to idle, photography.

2. Description of the Prior Art

Recent advances in motor drive systems for still cameras have made popular the use of 250-frame films and have led to the development of 800-frame films and the possible development of films having even longer footage.

The number of exposed frames of such long-footage film has heretofore been indicated by a counter plate of relatively large diameter and a mechanism for incrementally moving the counter plate one scale division for every two, five, or even ten frames of film movement, the number of exposures being indicated in multiples of a single frame because of the limited area available for the indicator. However, indication of exposures in multiples of a single frame does not enable the photographer to know the exact number of frames exposed.

It has been proposed to utilize a multi-digit numerical counter of the type employed in tape recorders or the like as an indicator. However, in still cameras a leader portion of the film must undergo idle photography during loading before regular photography can be commenced. For example, in the case of a 250-frame film, a leader portion corresponding to about five frames must undergo idle photography, and in case of an 800-frame film, a leader portion corresponding to seven or eight frames must undergo idle photography. As a result, when a multi-digit numerical counter of the type described above is utilized in a still camera, the counter is incrementally advanced after each idle shot so that the counter does not indicate the exact number of frames exposed during regular photography.

Indicator systems for indicating the presence of film in the camera have been proposed, but none of these systems clearly indicates whether or not the leader portion of the film has been taken up during loading.

SUMMARY OF THE INVENTION

It is, accordingly, an object of the present invention to provide an improved film frame counting device which indicates the exact number of frames exposed during regular photography.

Another object of the present invention is to provide a counting device of the above-described type which indicates whether or not idle photography has been completed.

A film frame counting device in accordance with the invention employs a numerical counter, means for changing the count in the counter each time the film is advanced a predetermined amount, and means for rendering the numerical counter ineffective during advance of the leader portion of the film and for thereafter rendering the numerical counter effective. In the preferred embodiments, a cam, which is incrementally rotated by an escapement mechanism responsive to film movement, holds a release lever in a first position for preventing counting during advancement of a predetermined number of initial frames corresponding to the leader portion of the film and thereafter moves the release lever to a second position for permitting counting. Means is provided for resetting the cam to a predetermined starting position prior to advancement of the leader portion of the film.

Other objects and advantages of the present invention will become apparent from the following detailed description taken in conjunction with the accompanying drawings.

DESCRIPTION OF THE PREFERRED EMBODIMENTS

Figure 1:
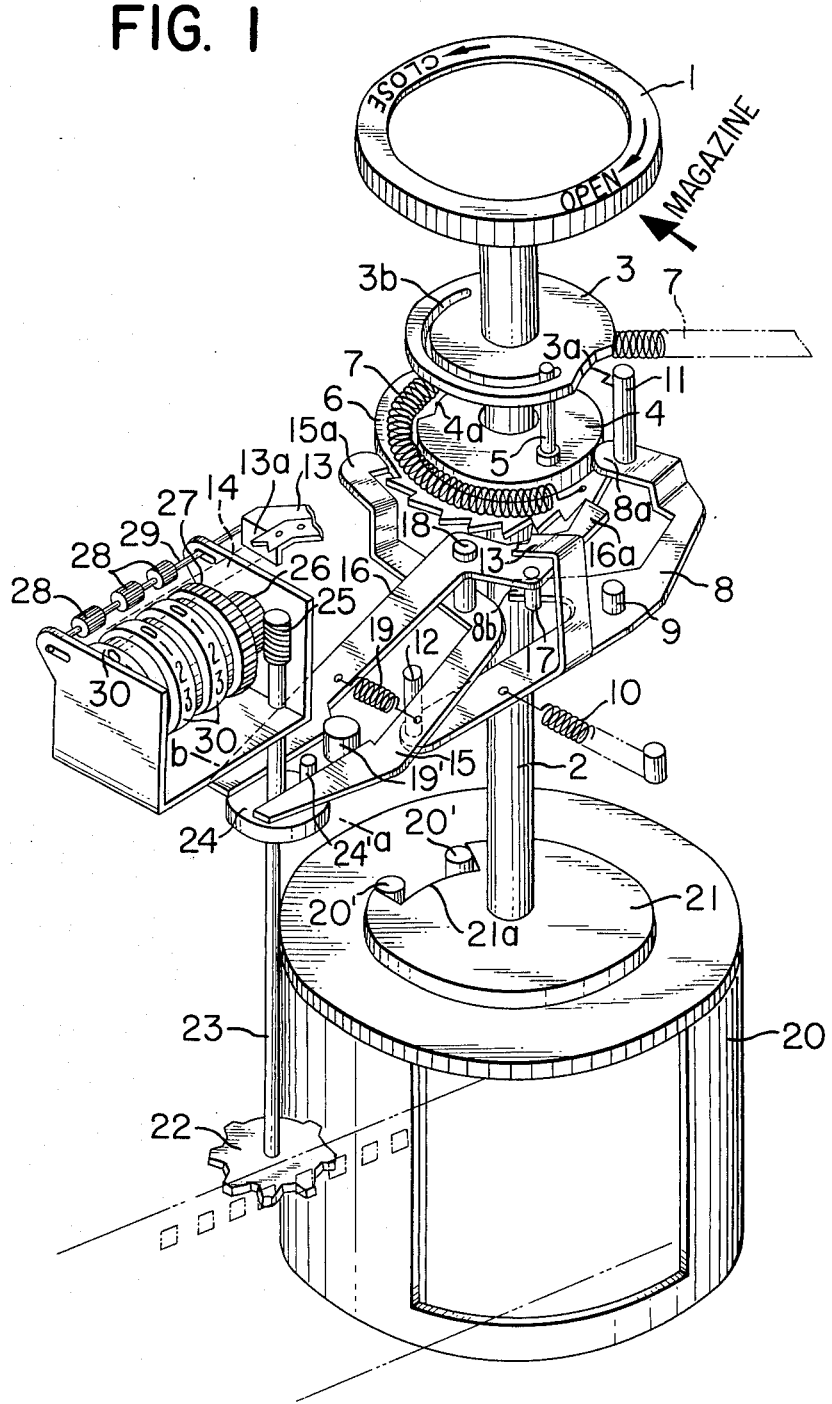
FIG. 1 is a perspective view of a first embodiment of a film frame counting device in accordance with the invention, this view showing the relationship of parts when the film magazine is open and with the release lever partly broken away.

Referring to FIGS. 1 through 6, which show a first embodiment of a film frame counting device in accordance with the present invention, reference numeral 1 designates a control knob for rotating a shaft 2 to open and close the film magazine 20 of the camera, and reference numeral 3 designates a release cam formed integrally with shaft 2. The cam is provided with a recessed portion 3a and a semicircular slot 3b. The recessed portion 3a is formed so that it faces a pin 11 on a later-described release lever 8 when the film magazine 20 is open. A counter cam 4 is mounted for rotation relative to shaft 2 and is provided with a recessed portion 4a and an interlocking pin 5 which is received by slot 3b of release cam 3. The recessed portion 4a is formed so that it is engaged by end 8a of a later-described release lever 8 during regular photography. Regular photography occurs after idle photography, which consists of feeding the number of film frames which corresponds to the leader portion of the film. A counter ratchet plate 6 formed integrally with the counter cam 4 is provided with a number of teeth related to the number of frames providing the leader portion of the film. The counter cam 4 and the counter ratchet plate 6 are loosely and concentrically mounted on the shaft 2, and are biased clockwise by a return spring 7, which is connected at one end to the body of the camera (not shown). The release lever 8, which is biased for counterclockwise rotation about a shaft 9 by a spring 10, has a pin 11 formed at end 8a thereof for engagement with the release cam 3, the end 8a of the lever being engageable with the counter cam 4. A release pin 12, formed at another end of release lever 8, is engageable with a later-described first restraining lever 15. The release lever 8 has a further end 8b engageable with a release pin 17 on a later-described second restraining lever 16, and has a counter-associated lever arm portion 13 (shown broken away).

The end 13a of lever arm portion 13 engages an idle gear shaft 29 (described later) and carries an indicator element or mark 14 (shown broken away) for indicating whether or not regular picturetaking can be effected. The restraining levers 15 and 16 have pawls 15a and 16a, respectively, for restraining rotation of the counter ratchet plate 6 by spring 7. Restraining levers 15 and 16 are biased clockwise and counterclockwise, respectively, about a shaft 18 by a spring 19 which is not as strong as spring 10 for release lever 8. A limit pin 19' is provided to limit clockwise and counterclockwise rotation of the restraining levers 15 and 16, respectively. The elements 15 through 19 and 19' cooperate with the ratchet plate 6 and spring 7 (in a manner to be described in detail later) to form an escapement mechanism for permitting the spring to rotate the ratchet plate by one tooth for advancement of each of the film frames which provide the leader portion of the film.

A film magazine receiver 21 has a cut away portion 21a for engaging magazine pins 20' of film magazine 20, thereby permitting opening and closing of the film magazine by control knob 1. A sprocket 22 engages the film perforations (in phantom) to cause a counter drive shaft 23 to effect one counterclockwise revolution for each frame of film advance. A disc 24 mounted for rotation with the counter drive shaft 23 is provided with a pin 24'. Pin 24' serves to rotate the first and second restraining levers 15 and 16 alternately, thereby alternately moving pawls 15a and 16a out of engagement with the teeth of the ratchet plate 6. A worm 25 provided at the end of shaft 23 meshes with a worm wheel 26 which is formed integrally with a counter drive gear 27. The drive gear and one of a plurality of numbered counter dials 30 are engageable by idle gears 28 on idle shaft 29 to rotate the counter dials to change the displayed count, which may be observed through a window (not shown) in the camera body. The elements 25 through 30 together constitute a conventional numerical counter.

Operation of the above-described embodiment will now be described. FIG. 1 shows the frame counting device after the film magazine 20 has been inserted into the camera and after the opening-closing knob 1 has been rotated in the direction of the arrow designated "Open" to the position shown in FIG. 1 for opening the film magazine. Because recess 4a of counter cam 4 is not in receiving engagement with end 8a of release lever 8, the release lever is held in the position shown in FIG. 1 in which end 13a of the lever arm portion 13 positions the idle gear shaft 29 to disengage the idle gears 28 from the counter drive gear 27 and from counter dials 30. Thus, rotation of the worm wheel 26 in response to subsequent film movement will be ineffective to change the count in the counter, which has been reset to zero in a manner described in detail later. When the release lever is in the position shown in FIG. 1, the indicator mark 14 appears in the display window (not shown) of the numerical counter, thereby indicating to the photographer that idle photography has not been completed. Alternatively, the indicator mark may be provided at other locations on the release lever 8. However, in that case a separate display window must then be provided to enable viewing of the mark.

Before the film is advanced to effect idle photography, the pin 24' on disc 24 is in the position shown in FIG. 1. Pawl 15a on the first restraining lever 15 enters halfway between a pair of ratchet teeth of the counter ratchet plate 6, while pawl 16a on the second restraining lever 16 engages one of the ratchet teeth to prevent clockwise rotation of the counter ratchet plate 6 and the counter cam 4 from the starting position shown in FIG. 1 by return spring 7.

Figure 2:
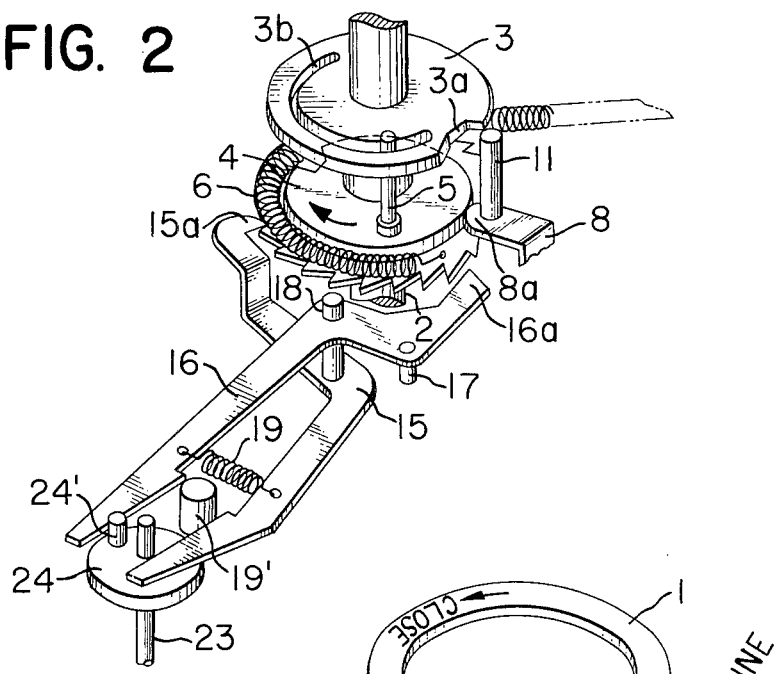
FIG. 2 is a fragmentary perspective view showing the relationship of parts during idle photography.

When the film is initially advanced to effect idle photography, sprocket 22, shaft 23 and disc 24 are caused to rotate counterclockwise one revolution for each frame of film advance. During the first quarter of one full rotation of disc 24, pin 24' rotates the second restraining lever 16 clockwise from its position in FIG. 1 to the position shown in FIG. 2. The pawl 16a is thus disengaged from the ratchet tooth of the counter ratchet plate 6, which is then rotated clockwise by an amount corresponding to one-half the distance between adjacent ratchet teeth by the return spring 7 until pawl 15a of restraining lever 15 engages a ratchet tooth, as shown in FIG. 2. The next quarter of a revolution of rotatable disc 24 enables restraining lever 16 to be rotated clockwise by spring 19, causing the pawl 16a of restraining lever 16 to enter halfway between two ratchet teeth. When the pin 24' on the rotatable disc 24 has been rotated three-quarters of a revolution from the position of FIG. 1, pin 24' engages restraining lever 15 to rotate this lever counterclockwise. Thereupon, the pawl 15a is disengaged from the ratchet tooth of the counter ratchet plate 6, which permits the ratchet plate to be rotated clockwise by an amount corresponding to one-half the distance between ratchet teeth by the return spring 7, until a tooth of the ratchet plate 6 is engaged by the pawl 16a of restraining lever 16.

When the disc 24 has been rotated through the final quarter of one full revolution to the position shown in FIG. 1, spring 19 returns restraining lever 15 to the position shown in FIG. 1, wherein pawl 15a enters halfway between two ratchet teeth. At this time, the film has been advanced one frame and the counter ratchet plate 6 and associated counter cam 4 occupy positions displaced clockwise from the positions of FIG. 1 by an amount corresponding to one ratchet tooth of the ratchet plate. The zero count indicated by dials 30 is not changed in response to the film advance because drive gear 27 is disconnected from the counter dials 30.

The above-described sequence of operation is repeated for subsequent full rotations of the sprocket 22 (i.e., each time the film is advanced one frame), the counter ratchet plate 6 and the counter cam 4 being rotated clockwise by an amount corresponding to one ratchet tooth for each such rotation.

Figure 3:
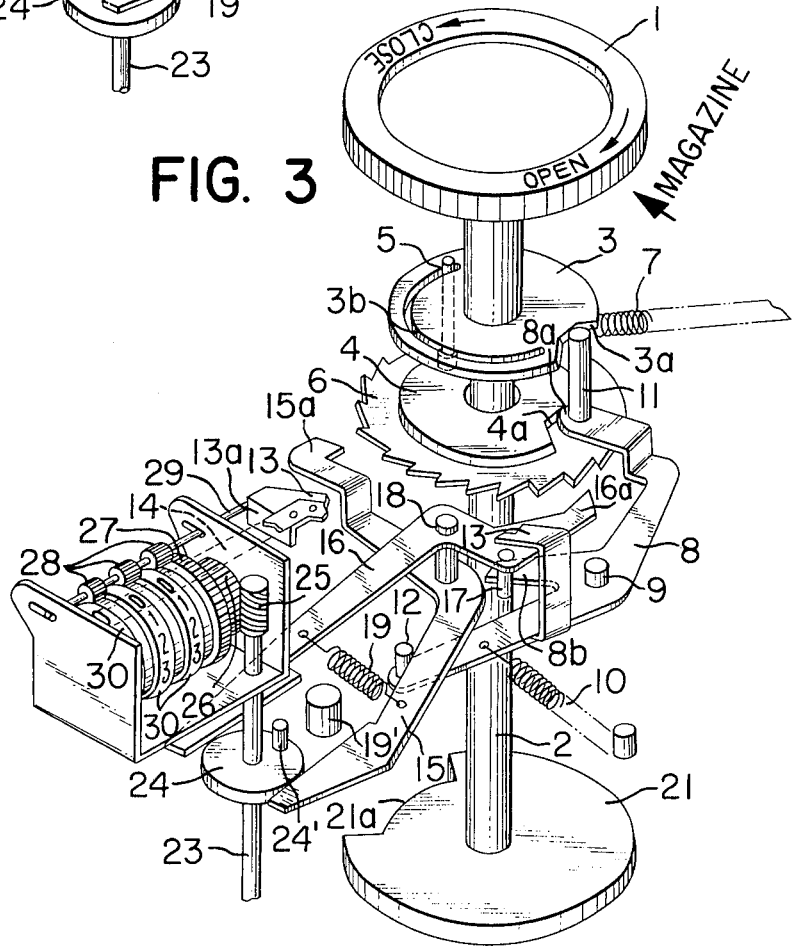
FIG. 3 is a perspective view similar to FIG. 1, this view showing the relationship of parts during regular photography.

Referring to FIG. 3, the recessed portion 4a of the counter cam is designed to receive end 8a of release lever 8 when the counter ratchet plate 6 and the cam have been incrementally rotated by the number of ratchet teeth equal to the number of film frames corresponding to the leader portion of the film. Therefore, the number of teeth on the ratchet plate and the location of the recessed portion 4a of the counter cam 4 are selected in accordance with the length of the leader portion of the film used. Thus, the cam holds the release lever in position for preventing changing of the count in the counter during advancement of the leader portion of the film.

The engagement of end 8a of the release lever with recessed portion 4a of the counter cam permits the release lever to be rotated counterclockwise by spring 10 from the position of FIG. 1 to the position shown in FIG. 3, pin 11 on the release lever 8 being received by the recessed portion 3a of release cam 3. Movement of the release lever to this position causes end 13a of lever arm portion 13 to move idle gear shaft 29 for causing idle gears 28 to engage drive gear 27 and counter counter dials 30, thereby permitting rotation of sprocket 22 in response to film advance to be effective to change the count indicated by dials 30. At the same time, indicator mark 14 disappears from the display window (not shown) of the numerical counter to indicate that idle photography has been completed and that regular photography can be commenced.

During the above-described movement of release lever 8, end 8b of the release lever acts against release pin 17 on restraining lever 16 for rotating restraining lever 16 clockwise to the position shown in FIG. 3, thereby disengaging the pawl 16a from the teeth of ratchet wheel 6. In similar fashion, release pin 12 on the release lever rotates restraining lever 15 counterclockwise to the position shown in FIG. 3 to disengage pawl 15a from the ratchet wheel teeth. Although both restraining members are disengaged from the ratchet wheel, thereby disabling the escapement mechanism which includes the restraining levers, the ratchet wheel and spring 7, the ratchet wheel and counter cam are prevented from rotating under the influence of spring 7 because spring 10 maintains end 8a of the release lever in engagement with notch 4a of counter cam 4. With the escapement mechanism thus disabled, further rotation of disc 24 in response to subsequent film movement will not change the position of counter cam 4 from the position of FIG. 3.

During regular photography (in which elements 1 to 21 remain in the positions shown in FIG. 3), idle gears 28 on idle shaft 29 couple the drive gear 27 to counter dials 30 so that the count indicated by dials 30 is incrementally advanced by one count for each frame of film advance. Thus, the counter always indicates the exact number of film frames fed during regular photography (i.e., the number of frames exposed).

Figure 4:
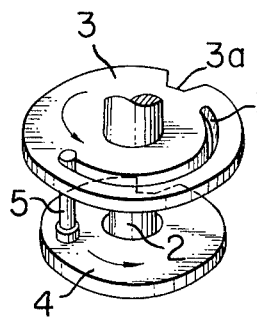
FIG. 4 is a fragmentary perspective view showing the relative positions of a release cam and a counter cam employed in the frame counting device during closing of the film magazine.
Figure 5:
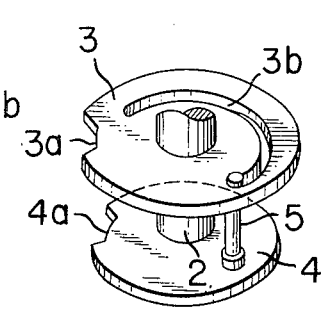
FIG. 5 is a fragmentary perspective view showing the relative positions of the release cam and the counter cam after the film magazine has been closed completely.

After the desired amount of regular photography has been completed, film magazine 20 may be removed from the film compartment of the camera, but this must occur with the film magazine closed prior to such removal. Referring to FIG. 3, the control knob 1 is rotated counterclockwise (in the direction of the arrow designated "Close") to close the film magazine. This counterclockwise rotation moves the recessed portion 3a of release cam 3 out of engagement with pin 11 on release lever 8, causing the release lever to be rotated clockwise to the position shown in FIG. 1. End 13a of the lever arm portion 13 of the release lever actuates the idle gear shaft 29 to move idle gears 28 out of engagement with drive gear 27 and counter dials 30. Simultaneously therewith, a reset lever (not shown) integral with the idle gear shaft 29 engages a heart cam (not shown) provided by dials 30 to reset the numerical counter to its initial zero count position, as is well-known. Also, the disengagement of the pin 11 on the release lever 8 from the recessed portion 3a of the release cam moves the end 8a of the release lever out of engagement with the recessed portion 4a of the counter cam. This enables the counter cam 4 and the counter ratchet plate 6 to be rotated counterclockwise with release cam 3, thereby to be reset to the starting positions shown in FIG. 1 by the cooperation between the slot 3b of the release cam and the interlocking pin 5 of the counter cam, as shown in FIG. 4. Movement of the release lever to the position of FIG. 1 also causes the restraining levers 15 and 16 to be returned to the positions shown in FIG. 1. When control knob 1 has been rotated fully counterclockwise to completely close the film magazine, the release cam 3 and the counter cam 4 assume the positions shown in FIG. 5.

Figure 6:
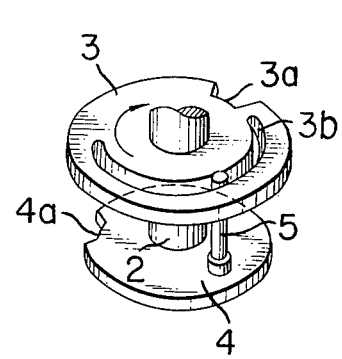
FIG. 6 is a fragmentary perspective view showing the relative positions of the release cam and the counter cam during opening of the film magazine.

After a new film magazine 20 is placed in the film compartment of the camera, magazine control knob 1 is rotated clockwise (in the direction of the arrow designated "Open") to open the film magazine. Referring to FIG. 6, this rotation of the control knob causes release cam 3 to be rotated clockwise relative to counter cam 4 and counter ratchet plate 6, which are held in position be restraining levers 15 and 16. When the film magazine 20 has been completely opened, the elements of the film frame counting device of the invention have the positions shown in FIG. 1, and the sequence of operations described above may be repeated.

Figure 7:
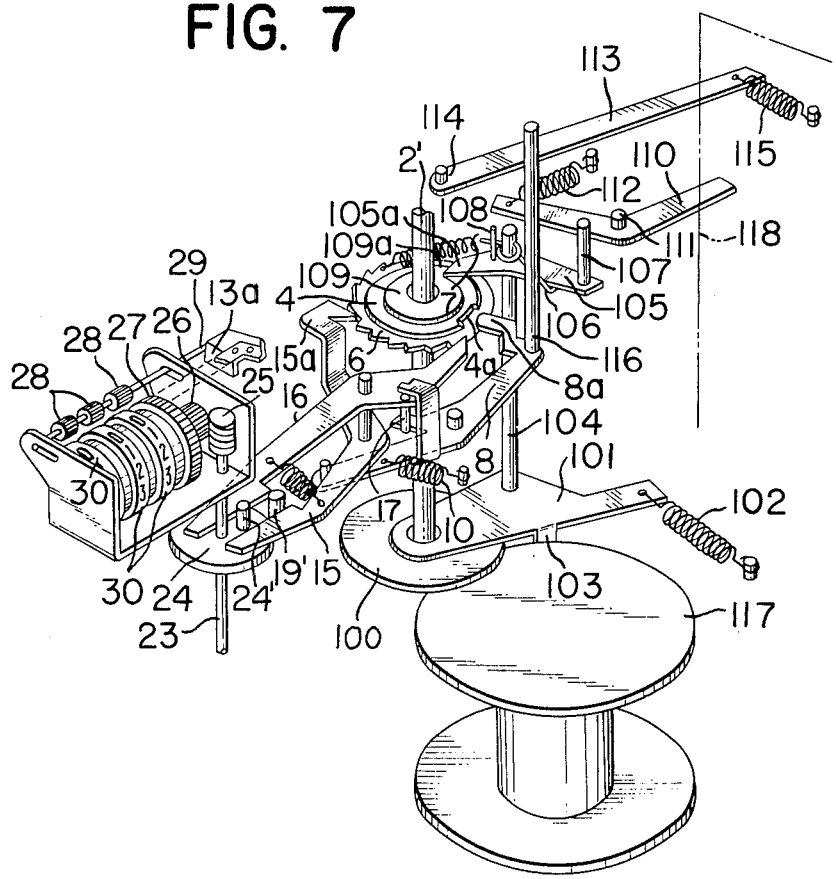
FIG. 7 is a perspective view showing a second embodiment of the invention, this view showing the relationship of parts with the film compartment cover of the camera open and before a film spool has been forced into the film compartment.

FIG. 7 shows a second embodiment of the present invention which employs a film spool or magazine 117 of the type which does not require opening and closing. As a result, this embodiment eliminates the control knob 1, the release cam 3, the interlocking pin 5 and the magazine receiver 21, which are employed in the first embodiment. Elements which are functionally identical to elements in the first embodiment are designated by the same reference characters.

Designated by 2' is a shaft about which the counter cam 4 and the counter ratchet plate 6 are rotatable. A flange 100 at the bottom of the shaft supports a set lever 101 which is loosely fitted around the shaft. The set lever, which is biased clockwise by a spring 102, has a depending portion 103 engageable by the film spool and has a shaft 104 which supports a charge lever 105 at the end thereof. The charge lever 105 is provided for rotating the counter cam 4 and counter ratchet plate 6 by a predetermined amount, and is rotatably mounted on the shaft 104 and biased counterclockwise by a spring 106 which has an end hooked to a pin 108 on shaft 104. The charge lever 105 has a release pin 107 at one end thereof, the other end 105a being engageable with a pawl 109a of a charge cam 109 which is formed integrally with the counter cam 4 and counter ratchet plate 6, which are loosely, concentrically mounted on shaft 2' and biased clockwise by a return spring 7 connected at one end to the body of the camera.

An interlocking lever 110 is biased for clockwise rotation about a shaft 111 by a spring 112, and has one end engageable with the cover 118 (in phantom) of the film compartment of the camera and the other end engageable with the release pin 107 for controlling engagement of the charge lever 105 with charge cam 109.

Another interlocking lever 113 is biased for clockwise rotation about a shaft 114 by the force of a spring 115, which is stronger than spring 10 acting on release lever 8. Lever 113 is engageable with cover 118 and with a counter release pin 116 provided on the release lever 8 for rotating the release lever clockwise when cover 118 is opened. The counter release pin 116 is functionally equivalent to pin 11 in the first embodiment.

FIG. 7 shows the second embodiment of the invention with the cover 118 open and before the film spool 117 is forced into the film compartment. When the film spool 117 is forced into the film compartment, a portion of the film spool engages depending portion 103 of set lever 101 to cause set lever 101 to be rotated counterclockwise about shaft 2'. As a result, charge lever 105, which is loosely fitted around the shaft 104, is also rotated about shaft 2'. Because spring 106 causes end 105a of charge lever 105 to engage pawl 109a of charge cam 109, the charge lever 105 rotates charge cam 109, counter cam 4 and counter ratchet plate 6 in counterclockwise direction to reset the counter cam to the starting position prior to feeding the leader portion of the film.

After the film spool has been forced into position, the cover 118 is closed, which causes cam release lever 110 to be rotated counterclockwise into engagement with release pin 107 on charge lever 105, thereby rotating the charge lever clockwise out of engagement with the charge cam 109. However, counter cam 4 and counter ratchet plate 6 are inhibited from rotating under the influence of spring 7 by pawls 15a and 16a of restraining levers 15 and 16, respectively. Closing cover 118 also causes lever 113 to be rotated counterclockwise out of engagement with counter release pin 116. However, because recessed portion 4a of counter cam 4 has been rotated out of engagement with end 8a of the release lever by the charge lever 105, the counter cam holds the release lever in the position shown.

Idle photography and regular photography may then be effected in the same manner as described above with respect to the first embodiment.

When regular photography has been completed, end 8a of the release cam is in engagement with recessed portion 4a of the counter cam and idle gears 28 are in engagement with worm wheel 26 and counter gear 27, as described previously with respect to the first embodiment. When the cover 118 is opened to remove the film spool 117, cam release lever 110 and lever 113 are rotated clockwise by the springs 112 and 115, respectively. Thus, lever 113 acts against pin 116 on release lever 8 to rotate the release lever 8 clockwise to the position shown in FIG. 7, which causes end 13a of lever arm portion 13 to move the counter gear shaft 29 for disengaging the idle gears from drive gear 27 and counter dials 30 and for resetting the numerical counter to its zero (start) position. The rotation of cam release lever 110 permits charge lever 105 to be rotated counterclockwise about shaft 104 by spring 106 to bring the end 105a thereof into engagement with the outer periphery of charge cam 109.

When the film spool 117 subsequently is removed from the camera, the set lever 101 is rotated clockwise about shaft 2' by spring 102, with end 105a of the charge lever keeping contact with the outer periphery of the charge cam 109 until it moves into engagement with pawl 109a. The positions of the element of the film frame counting device at this time are illustrated by FIG. 7 and the sequence of operations described above may be repeated.

With the construction of the present invention, there are provided film frame counting devices in which the numerical counter is not advanced during feeding of the leader portion of the film (i.e., during idle photography), but is advanced only during regular photography so that the exact number of film frames exposed may be indicated in single frame units.

Furthermore, the present invention permits such indication to be effected by a conventional numerical counter and readily permits changes in design which would result from changes in the type of numerical counter employed.

Also, because the release lever 8 prevents restraining levers 15 and 16 from engaging the pin 24' on the rotatable disc 24 during regular photography, the drag on the film caused by the sprocket 22 is minimized.

Finally, the provision of an indicator mark 14 which is operatively associated with the release lever 8 enables the photographer to ascertain whether or not idle photography has been completed.

It is believed that the advantages and improved results furnished by the film frame counting devices of the invention will be apparent from the foregoing description of several preferred embodiments of the invention. Various changes and modifications may be made without departing from the spirit and scope of the invention as sought to be defined in the following claims.

We claim:

1. A film frame counting device in a camera for indicating the number of film frames exposed during regular photography, the device comprising:
   a numerical counter;
   count-changing means for changing the count in the counter each time the film is advanced a predetermined amount;
   a release member movable between a first position for preventing changing of the count in said counter and a second position for permitting changing of the count;
   a cam; and
   means for rotating the cam in response to advancement of film in said camera;
   the cam having means cooperable with the release member for holding the release member in said first position during a predetermined amount of rotation of the cam corresponding to advancement of leader portion of the film and for moving the release member from said first position to said second position upon completion of said predetermined amount of rotation.

2. A device as set forth in claim 1, further comprising means for resetting the cam to a predetermined starting position prior to advancement of the leader portion of the film.

3. A device as set forth in claim 2, wherein the camera has means for opening and closing a film magazine containing the film, and wherein the resetting means comprises means for returning the cam to said starting position upon closing of the film magazine.

4. A device as set forth in claim 3, wherein the means for opening and closing the film magazine comprises a knob which is rotatable to opening and closing positions, and wherein the resetting means comprises an additional cam rotatable with the knob, the additional cam having means for rotating the first-mentioned cam to said starting position when the knob is rotated from opening to closing position.

5. A device as set forth in claim 4, wherein said additional cam has means for moving the release member from said second to said first position when the knob is rotated from opening to closing position.

6. A device as set forth in claim 2, wherein the resetting means comprises means for moving the cam to said starting position when a film spool containing the film is loaded into the film compartment of the camera.

7. A device as set forth in claim 6, wherein the resetting means comprises:
- a charge cam having the first-mentioned cam mounted for rotation therewith;
- a set lever having means engageable by the film spool for pivoting the set lever when the film spool is loaded into the film compartment;
- a charge lever pivotally mounted on the set lever and having one end engageable with the charge cam for rotating the charge cam to return the first-mentioned cam to its starting position when the set lever is pivoted by loading of the film spool; and
- an interlocking member associated with the cover of the film compartment for moving said end of the charge lever into engagement with said charge cam when the cover is opened and for moving the end of the charge lever out of engagement with the charge cam when the cover is closed.

8. A device as set forth in claim 7, further comprising additional interlocking means associated with the cover to move the release member from said second position to said first position when the cover is opened.

9. A device as set forth in claim 1, wherein the leader portion of the film comprises a predetermined number of initial film frames, and wherein the means for rotating the cam comprises an escapement mechanism including a ratchet plate having the cam mounted for rotation therewith, means for biasing the ratchet plate for rotation in a first direction, and means for permitting the biasing means to rotate the ratchet plate by one tooth for advancement of each of said predetermined number of initial film frames.

10. A device as set forth in claim 9, wherein the release member has means for disabling the escapement mechanism when the release member is in said second position.

11. A device as set forth in claim 1, further comprising means for indicating whether the release member is in said first or said second position.

12. A device as set forth in claim 1, wherein the release member has means for resetting the counter to zero when the release member is in said first position.

* * * * *